Figure 1:
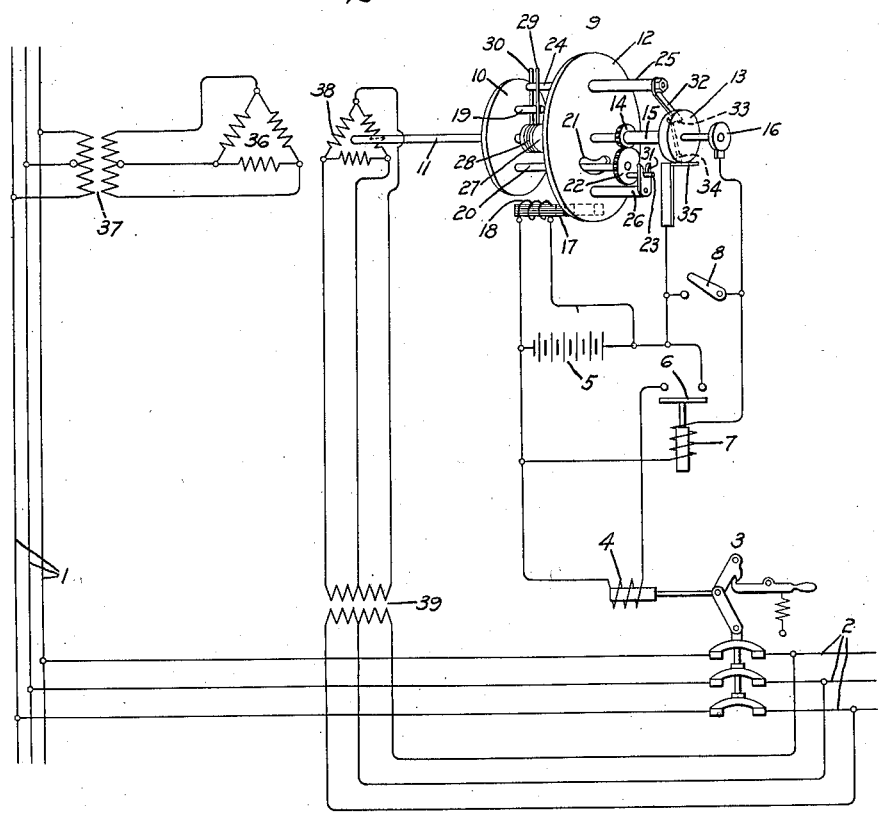

Aug. 14, 1928.

O. C. TRAVER 1,680,707

SYNCHRONIZING DEVICE

Filed Dec. 31, 1925

2 Sheets-Sheet 1

Inventor:
Oliver C. Traver,
by
His Attorney.

Aug. 14, 1928.
O. C. TRAVER
1,680,707
SYNCHRONIZING DEVICE
Filed Dec. 31, 1925   2 Sheets-Sheet 2
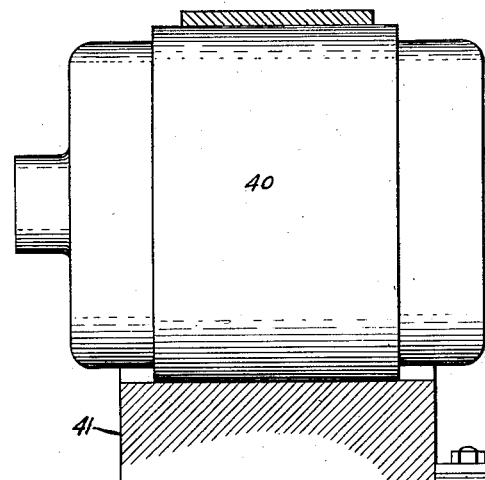
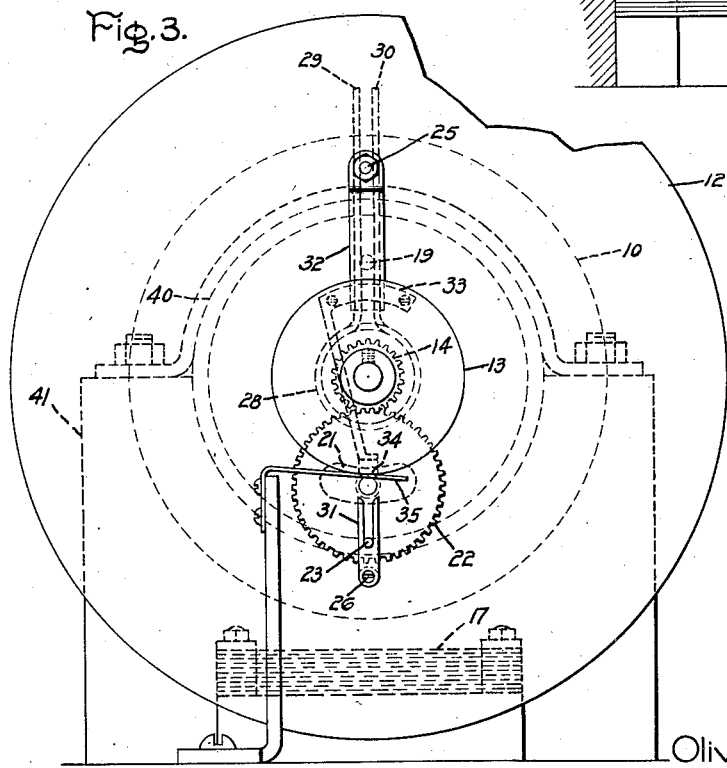
Inventor:
Oliver C. Traver,
by
His Attorney.

Patented Aug. 14, 1928.

1,680,707

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

SYNCHRONIZING DEVICE.

Application filed December 31, 1925. Serial No. 78,714.

My invention relates to synchronizing devices, and has for its principal object the provision of an improved means for causing two alternating circuits to be interconnected when they are in phase and operating at substantially the same frequency.

It is desirable that a synchronizing device for controlling the operation of a circuit breaker connected between alternating current circuits be operable both to avoid operation of the circuit breaker until the phase difference between the circuit voltages is brought within certain limits and to cause energization of the circuit breaker control circuit at an instant of time sufficiently in advance of phase coincidence between the circuit voltages to cause the circuit breaker to be closed just as the system voltages are brought into phase with one another.

The time interval between energization of the circuit breaker control circuit and closure of the switch is substantially constant for any given circuit breaker. The rapidity with which the circuit voltages come into synchronism, however, is dependent on the difference between the system frequencies. In order to ensure closure of the circuit breaker at the instant when the system voltages are in phase, I provide a synchronizing mechanism operated in accordance with the difference between the system frequencies to energize the mechanism for closing the circuit breaker at a time prior to phase coincidence which is just long enough to ensure the closure of the circuit breaker when the phases coincide.

My invention will be better understood from the following description when considered in connection with the accompanying drawings and its scope will be pointed out in the appended claims.

Referring to the drawings, Fig. 1 shows a synchronizing system wherein my invention has been embodied; and Figs. 2 and 3 show certain details in the construction of the synchronizing device comprised in the system illustrated by Fig. 1.

In the particular embodiment of my invention which I have shown in the drawing, two alternating current circuits 1 and 2 are adapted to be interconnected through a switch 3 comprising an operating coil 4. A source of current shown as a battery 5 is provided for energizing the switch operating coil 4 in response to closure of a relay switch 6. The relay switch 6 has an operating coil 7 to which current is supplied from the source 5. A synchronizing device 9 closes the circuit of the energizing coil 4 at the proper time through suitable contacts as will hereinafter be described. I also provide a manually operated switch 8 by which the actuating winding 4 may be energized by hand if desired.

The synchronizing device 9 comprises a driving member 10 fixed to a shaft 11, a conductive contact member 12 rotatably mounted on the shaft 11, and insulation member 13 coupled to a gear 14 through a hollow shaft 15 that is rotatably mounted on the shaft 11. The member 13 is provided with a conductive segment 33 interconnected with a contact 34. A slip ring 16 is fixed to the shaft 11.

A drag magnet 17 is provided for exerting on the disk 12 a retarding force having its magnitude determined by the rotational speed of the disk. It will be apparent that the magnet 17 may be either a permanent magnet or an electromagnet. It has been illustrated as comprising a coil 18 which is supplied with current from the source 5.

It will be observed that a pair of projecting members 19 and 20 are mounted on the disk 10 at some distance from its center, and that the member 20 extends through a slot 21 in the disk 12 and at its end is provided with a gear 22 which meshes with the gear 14 and is provided with a projecting member 23 located at some distance from its center. The disk 12 is provided with projecting members 24, 25 and 26 and is fixed to a hub member 27 which is rotatable about the shaft 11 and is surrounded by a spiral spring 28 having projecting end portions 29 and 30. These end portions cooperate with the projecting members 19 and 24 to form between the disks 10 and 12 a flexible connection which tends to maintain a predetermined relation between positions of these disks and that of the insulator disk 13. Within the limits of the slot 21, however, the disks 10 and 12 may rotate relatively to one another.

The effect of relative movement between the disks 10 and 12 is to rotate the gear 22 about its axis due to the fact that its projecting member 23 extends through a slotted member 31 fixed to the end of the projecting member 26 which is mounted on the disk 12.

Rotation of the gear 22 about its axis produces rotation of the gear 14 and the insulation disk 13 to which the gear 14 is mechanically connected through the hollow shaft 15. A contact member 32 mounted on the end of the projecting member 25 is arranged to engage the side of the insulation disk 13 and to make contact with the conductive segment 33 which is mounted on the side of the insulation disk and is connected to the contact 34 located at the edge of the insulation disk. The edge of the insulation disk rotates in contact with a contact member 35 connected to one terminal of the source 5. The contact 32 is so positioned as to be at the center of the conductive segment 33 when the shaft 11 is stationary.

Rotation of the shaft 11 may be effected by any suitable device that is responsive to the phase and frequency relations existing between the circuits 1 and 2. This device has been illustrated as comprising a stator winding 36 connected to the circuit 1 through a transformer 37 and a rotor winding 38 connected to the circuit 2 through a transformer 39. It will be apparent, however, that synchronous motors mechanically interconnected through a differential gear similar to that illustrated in Letters Patent of J. L. Hall, No. 706,554 or other suitable means may be substituted for the windings 36 and 38. In any case the angular position of the movable element 12 about the shaft 11 will determine both the point of engagement of the contact 32 with the insulation disk 13 and the angular position of this disk about the shaft 11.

The switch 8 is provided for causing the circuits 1 and 2 to be interconnected independently of the synchronizing device 9 and will of course be used only when it is known that the lines are in synchronism or that one of the lines is deenergized. The structural arrangement of the various parts of the synchronizing device 9 are clearly shown in Figs. 2 and 3. It should be noted that the windings 36 and 38 are wound on stator and rotor cores mounted within a casing 40 which is supported by base 41, and that the casing and stator core may be adjusted about the rotor axis for causing the contact 34 to be brought into engagement with brush 35 when system voltages are in phase. The various structural features of the device will be readily understood in view of the previous explanation.

The operation of the synchronizing device 9 will be readily understood if it be assumed that the switch 3 is open and that the stator core and casing 40 have been adjusted to bring contact 34 into engagement with the brush 35 when the systems are in phase and the spring 28 is contracted. If the circuits 1 and 2 are operating at widely different frequencies the speeds of the rotating fields produced through windings 36 and 38 are widely different, the shaft 11 is rotated at a high rate of speed, a comparatively large retarding force is exerted on the disc 12 by the magnet 17, the flexible coupling between the discs 10 and 12 is extended, the contact member 32 is maintained out of engagement with the contact segment 33, and the circuits of the operating coils 4 and 7 are incomplete.

As the frequencies of the circuits 1 and 2 approach equality, the rotational speed of the shaft 11 is reduced, a smaller retarding force is exerted on the disc 12 through the magnet 17, and the flexible coupling between the discs 10 and 12 contracts and tends to move the contact member 32 into engagement with the conductive segment 33. When the system frequencies are sufficiently near equality to permit closure of the switch 3, the contact member 32 comes into engagement with the conductive segment 33 and at an instant of time preceding phase coincidence between the circuit voltages by a predetermined time interval, the relay coil 7 is energized through a circuit comprising source 5, contact member 35, conductive segments 34 and 33, contact member 32, member 25, disk 12, shaft 11, and slip ring 16, thus closing the relay switch 6 and energizing the circuit breaker operating coil 4 long enough before the system voltages come into phase to ensure closure of the circuit breaker at the instant of phase coincidence.

As previously indicated, the stator 40 is so adjusted as to cause the contact 34 to be in engagement with the brush 35 at the proper time to close switch 3 when the circuit voltages are in phase, and the device 9 is so constructed that the contact member 32 is at the center of the conductive segment 33 when the spring 28 is contracted. The angular position of the contact 34 about the the shaft 11, however, is dependent on the shaft speed and consequently on the difference between the circuit frequencies. This angular adjustment or positioning of the contact 34 relative to a given point on the shaft 11 in accordance with the difference between the circuit frequencies is essential because the time interval between energization of the operating coil 4 and closure of the switch 3 is substantially constant, whereas the rotational speed of the contact 34 varies in accordance with the difference between the circuit frequencies.

Thus if the frequencies of the two circuits differ but slightly, the rotational speed of the contact 34 is comparatively slow, the flexible coupling between the discs 10 and 12 is extended accordingly, the contact 34 is advanced and the operating coil 4 is energized at an instant of time which precedes phase coincidence of the circuit voltages by an interval of time just long enough to ensure closure of the circuit breaker at the instant when the system voltages come into phase with one another.

If the difference between the frequencies of the two circuits becomes greater, however, the rotational speed of the shaft 11 is higher, a greater tensile force is exerted through magnet 17 and disk 12 on the flexible coupling between the discs 10 and 12, the advance of contact 34 relative to shaft 11 is increased in proportion to the increase in the frequency difference, and the operating coil 4 is still energized at an instant of time which precedes phase coincidence of the system voltages by a time interval permitting closure of the switch at the proper instant. The synchronizing device 9 thus operates over a range of frequency difference determined by the length of the segment 33 to cause energization of the operating coil 4 sufficiently in advance of phase coincidence between the circuit voltages to produce interconnection of the circuits just as they come into phase with one another.

The embodiment of the invention illustrated and described herein has been selected for the purpose of clearly setting forth the principles involved. It will be apparent however that the invention is susceptible of being modified to meet the different conditions encountered in its use and I therefore aim to cover by the appended claims all modifications within the spirit and scope of my invention.

What I claim as new and desire to secure by Letters Patent of the United States, is:

1. The combination of a plurality of alternating current circuits, means for interconnecting said circuits, a control circuit for energizing said interconnecting means, and a device comprising a shaft, means operable to rotate said shaft continuously in a direction and at a speed dependent on the difference between the frequencies of the electromotive forces of said circuits, a driving member fixed to said shaft, contact members rotatable about said shaft and biased to a position to complete said control circuit when the electromotive forces of said alternating current circuits are in phase, and means operable to vary the space relation between the contacts of said contact members in accordance with the speed of said shaft for energizing said control circuit at an instant of time preceding phase coincidence of the electromotive forces of said circuits by an interval of time which is substantially independent of the rotational speed of said shaft.

2. A synchronizing device comprising a shaft, a driving member fixed to said shaft, a pair of contact members rotatable about said shaft, and means interposed between said driving member and said contact members for maintaining between the contacts of said contact members a space relation which is dependent on the speed of said shaft.

3. A synchronizing device comprising a shaft, a driving member fixed to said shaft, a pair of contact members rotatable about said shaft, and means comprising gears interposed between said driving member and one of said contact members for maintaining between the contacts of said contact members a space relation which is dependent on the speed of said shaft.

4. A synchronizing device comprising a shaft, a driving member fixed to said shaft, a pair of contact members rotatable about said shaft, and means comprising a flexible coupling interposed between said driving member and one of said contact members and cooperating gears interposed between said driving member and the other of said contact members for controlling the spacing between the contacts of said contact members in accordance with the speed of said shaft.

5. A synchronizing device comprising a shaft, a driving member fixed to said shaft, a pair of contact members rotatable about said shaft, cooperating gears interposed between said driving member and one of said contact members, and a connection between said gears and the other of said contact members for operating said gears in accordance with relative movement between said driving member and said other contact member.

6. A synchronizing device comprising a shaft, a driving member fixed to said shaft, a pair of contact members rotatable about said shaft, cooperating gears interposed between said driving member and one of said contact members, a connection between said gears and the other of said contact members for operating said gears in accordance with relative movement between said driving member and said other contact member, and a resilient coupling between said driving member and said other contact member.

7. The combination of a plurality of alternating current circuits, means for interconnecting said circuits, and a device comprising a shaft, means operable to rotate said shaft continuously in a direction and at a speed dependent on the difference between the frequencies of the electromotive forces of said circuits, a driving member fixed to said shaft, contact members rotatable about said shaft, means for varying the space relation between the contacts of said contact members in accordance with the speed of said shaft, and a circuit controlled by said contacts for energizing said interconnecting means.

8. Synchronizing apparatus for connecting alternating current circuits comprising circuit controlling means, means responsive to the electrical conditions in the circuits for starting the connecting operation of the circuit controlling means prior to phase coincidence and means controlled in accordance with the relative frequencies of the electromotive forces of the circuits for causing said connecting operation to be started at a substantially constant time prior to the in-phase condition of the electromotive forces comprising a plurality of relatively rotatable members arranged to be rotated continuously in a direction and at a speed dependent on the difference between said frequencies.

9. Synchronizing apparatus for operation in accordance with the frequency and phase relations of two alternating electromotive forces comprising a plurality of relatively movable members, means arranged when energized from two different sources of alternating electromotive force for moving one of said members in a direction and at a speed dependent on the relative frequencies of said electromotive forces and means for maintaining between said members a space relation dependent on the relative frequencies of said electromotive forces.

10. Synchronizing apparatus for operation in accordance with the frequency and phase relations of two alternating electromotive forces comprising a plurality of relatively rotatable members, means arranged when energized from two different sources of alternating electromotive force for rotating one of said members continuously in a direction and at a speed dependent on the difference between the frequencies of said electromotive forces, and means for maintaining between said members an angular displacement dependent on said difference.

11. Synchronizing apparatus for operation in accordance with the frequency and phase relations of two alternating electromotive forces comprising a plurality of relatively rotatable members, means arranged when energized from two different sources of alternating electromotive force for rotating one of said members continuously in a direction and at a speed dependent on the difference between the frequencies of said electromotive forces, and means comprising a yieldable connection between said members for maintaining between the members an angular displacement dependent on said difference.

12. A synchronizing device for operation in accordance with the frequency and phase relations of two alternating electromotive forces comprising a shaft, means arranged when energized from two different sources of alternating electromotive force to rotate the shaft continuously in a direction and at a speed dependent on the difference between the frequencies of the electromotive forces, means including a contact rotatable with and relatively to said shaft, a stationary brush arranged to be engaged by said contact on rotation thereof, and means operable to vary the angular position of said contact relatively to said shaft in accordance with the speed thereof.

In witness whereof, I have hereunto set my hand this 30th day of December, 1925.

OLIVER C. TRAVER.